Oct. 31, 1961   H. M. BOND ET AL   3,006,463
SELF-FUSING TAPE
Filed Feb. 28, 1957
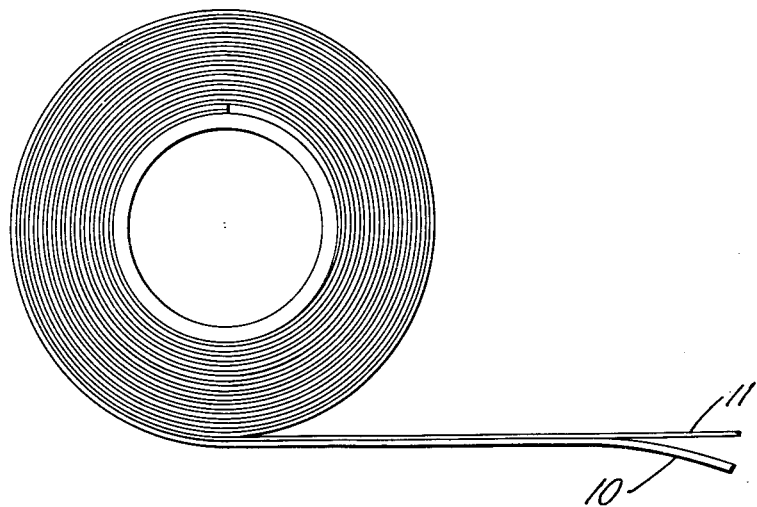
INVENTORS
HERBERT M. BOND
GAYLORD L. GROFF
BY
Carpenter, Abbott, Coulter & Kinney
ATTORNEYS

3,006,463
SELF-FUSING TAPE

Herbert M. Bond, St. Paul, and Gaylord L. Groff, North St. Paul, Minn., assignors to Minnesota Mining and Manufacturing Company, St. Paul, Minn., a corporation of Delaware
Filed Feb. 28, 1957, Ser. No. 643,181
7 Claims. (Cl. 206—59)

This invention relates to a self-fusing silicone composition and, more particularly, to a self-fusing silicone electrical tape.

The tape of this invention behaves as follows: Under ordinary hand tension it can easily be stretched to at least twice its initial length and, upon release of stress, will retract substantially immediately to its original length. It is only slightly tacky, and is easily handled with the fingers; yet it adheres to itself when overlapped upon itself, as is done, for example, in wrapping a splice. When it is stretched up to about twice its original length, under ordinary hand tension, and wrapped in convolutions upon itself around an object, it remains in place without unwinding even after an operator releases his fingers from the wrapping; and it becomes impossible to unwind or delaminate into its original tape form after it is left in such wrapped condition for a relatively short period of time at room temperature, e.g., about one week at 70° F. In other words, after a period of time at room temperature it fuses together. It thus forms an integral, flexible, void-free seal. The seal has good electrical properties and high resistance to embrittlement, cracking and electrical failure under a wide temperature range of operation. For example, it can withstand continuous operation at 350° F. without embrittlement, cracking or appreciable loss of electrical properties. It even can withstand short periods of operation at temperatures as high as 480° F. or higher. It further can withstand operation at temperatures as low as minus 80° F., or even lower, remaining suitably flexible and providing good electrical insulation.

One of the more valuable uses for our new tape article is that of wrapping and sealing splices made between or on large electrical cables. Corona discharge and ozone attack are problems encountered. In the past, splices of this type have frequently been wrapped with two or three different types of tape, or the area of a splice has been filled with certain materials such as, for example, epoxy resin compositions, and also wrapped with tape. The technique has been cumbersome and desirably would be avoided but for the necessity of taking adequate precaution when using prior art insulating materials in order to prevent, insofar as possible, corona discharge and deteroration of the insulation as a result of attack by generated ozone. Using our tape, such a cumbersome technique can be avoided, as is desired, and a void-free seal of good insulating value to inhibit or "resist" corona discharge can be formed merely by snugly wrapping the splice with our tape, under hand tension, in overlapping convolutions until an adequate layer of ozone-resistant insulation is built up; and thereafter, allowing a suitable period of time for the wrapped tape to fuse together to form a void-free seal.

Our tape is not pressure-sensitive in the ordinary sense of the term. The bond, if it may be called such, between our tape and various surfaces, such as for example glass, is very weak as compared to the strength of such a bond in the case of the usual popular pressure-sensitive adhesives of the rubber resin type. Nevertheless, our tape is slightly tacky and when it is wrapped in overlapping convolutions, it adheres well to itself and fuses together into an integral mass if left in contact with itself over a period of time. Yet it can be separated from itself easily, if such is necessary, during periods of time shortly after it has been stuck to itself, as for example in the wrapping of splices. Thus it is easily handled. In handling, it does not stick tenaciously to the fingers; and it does not bunch into a coherent mass or gob that is impossible to separate into original tape form.

In combination with the foregoing handleable and other characteristics, the tape of this invention has good film strength. Also, in the preferred embodiment, it can be stretched considerably, e.g., in some cases as much as 500% or more of its initial length, before breakage or tensile failure.

For electrical uses as aforedescribed, our tape should be at least 15 mils in thickness and usually not over about 125 mils thick. Adequate body for the tape itself is necessary but conformability of the tape to surfaces on which it is applied is also a requirement. At thicknesses between 15 and 125 mils the most advantageous balance of these desired properties is found. For some uses, however, the body requirements of tape formed from the composition hereof may be comparatively low. For example, tapes as thin as 10 mils, or thinner, may be used as bonding films between layers of other types of insulation, or between such insulation and wires, or as external wrapping films around insulation.

The aforedelineated combination of properties for the tapes hereof is admittedly rather unusual and not found insofar as we are aware, in any present silicone products. The combination of properties becomes even more unusual when it is realized that our tape may be made by blending certain known ingredients in correct proportion, as will be further explained, then forming the blend into sheet form and giving it a brief cure treatment. Broadly, the ingredients of the blend include a silicone gum polymer, a silicone resin, and a particular type of filler, all as further explained hereinafter. The blended ingredients are subjected to brief cure conditions, and to accomplish this a curing agent is usually included in the blend. The particular type of filler employed is critical. The type of curing agent used, if any, is critical. All of the ingredients are available commercially, as illustrated in the examples hereof, yet in the art to which this invention appertains, no one, insofar as we are aware, has successfully combined them to form a silicone product having the properties of the article hereof. Nor would one expect, in the light of past experience with silicones, that from the ingredients used one could form a product having the combination of properties aforedelineated.

The curing of silicones is of course, well known. There is a great deal of prior art on this subject. In the usual case a silicone polymer, when cured, becomes non-tacky; and such polymers in film coatings have been widely used as release agents. No self-fusing property is in evidence. Likewise, cured silicone resins are non-tacky in character and also are frequently very hard. Combinations of silicone gum polymers and resins have been formulated into pressure-sensitive adhesives, as, for example, taught in United States Patent 2,736,721 to Dexter; and these adhesives have been shown to increase in adhesive strength by cure treatment as taught in the Dexter patent. Very limited amounts of certain fillers are also suggested as components of Dexter's pressure-sensitive adhesive systems. Silicone pressure-sensitive adhesives of the Dexter patent, however are impossible to handle as self-supporting films. In the unsupported state, they bunch together into a gob or unwieldy mass during handling, and it is impossible to separate the gob of material into its original film form, even if one attempts to do this immediately after the gob is formed. Films of these pressure-sensitive adhesives, while easily stretched, exhibit only weak retractive forces when stress is released. In the light of the foregoing, therefore, it becomes particularly surprising to find that by proper balance and selection of known ingredients, following the teachings hereinafter set forth, an easily handleable, non-gobbing, self-supporting, rubbery silicone tape or film can be formed; and that such tape is easily stretched, yet shows rapid and strong retractive forces upon release of stress, and additionally possesses the characteristic of being self-fusing at room temperature.

The drawing made a part hereof illustrates in side elevation a roll of our self-supporting handleable tape or film 10 having a low adhesion interliner or separator material 11 between the convolutions of the film in the roll.

The following examples are offered to illustrate the new and unusual silicone product of this invention, but are not to be construed as limitative of the scope thereof. In the examples, the proportions of the various ingredients are given in parts by weight unless otherwise stated.

*Example 1*

85.7 parts of "Silastic–430" gum, a soft, putty-like, silicone gum polymer marketed by Dow Corning Corporation, were banded on a rubber mill for about 2 minutes while cool water was run through the rolls of the mill. "Silastic–430" gum is an essentially linear silicone polymer having a ratio of organic groups to silicon atoms of about 2 to 1 and consists predominantly of polymerized dimethyl siloxane units with about 0.2% by weight of vinyl groups in the polymer. It is soluble in xylene, and has a Williams plasticity measurement of about 45 mils.

Next 34.5 parts of a fine powder (particles ranging from about 15 to about 20 millimicrons) fume silica filler, marketed under the name "Cab-O-Sil," were blended in the gum banded on the rubber mill by milling for about 15 minutes, after which the cool water passing through the rolls of the mill was turned off and steam sufficient to heat the rolls to about 300° F. introduced therein.

Then 57.3 parts of a blended mixture consisting of about 75% silicone resin and 25% dimethyl silicone gum polymer were blended into the mass on the rubber mill by continued milling for about 10 minutes. The silicone gum component of this blended mixture brought the total silicone gum portion of the mass on the rubber mill to about 100 parts. Based on 100 parts silicone gum, about 43 parts of silicone resin are now present in the mass on the rubber mill. The blended mixture of 75% resin and 25% gum here added was formed by driving off the xylene solvent from Dow Corning Corporation's "A–4000" adhesive, which is a xylene solvent dispersed mixture of about 75 parts silicone resin and about 25 parts of a high molecular weight (about 550,000), linear, dimethyl silicone gum. The silicone resin in this blend is understood to be a copolymer of $(CH_3)_3SiO_{1/2}$ units and $SiO_2$ units having a ratio of $(CH_3)_3SiO_{1/2}$ units to $SiO_2$ units of about 0.85. Both the silicone resin and gum in this mixture are soluble in xylene.

After the mass on the rolls was blended together, the steam in the rolls was turned off and cool water introduced therein to bring the blend to about room temperature.

Next 1.8 parts of "Cadox TS," a curing catalyst for silicone gums marketed by the Cadet Chemical Company, and 0.4 part of carbon pigment, a fine powder (particles of about 172 millimicrons average diameter), essentially neutral (a pH of about 7.2), thermal black, were blended into the mass on the rolls by additional milling for about 5 minutes. "Cardox TS" is a mixture of about 50% dichlorobenzoyl peroxide, which is the effective catalytic component, and a silicone oil such as a dimethyl silicone fluid having a viscosity of about 12,500 centistokes at 100° F. The effective catalytic component is dispersed in the silicone oil in order to facilitate blending of the curing catalyst with the silicone gum on the rubber mill.

The batch was then sheeted off the mill and extruded at about room temperature (cool water was used around the extrusion orifice) in a sheet about 29 mils thick upon a carrier having a low adhesion surface. The carrier employed was a 4 mil thick sheet of flexrope paper (made for example, from chopped manila fibers obtained from old rope) surface sized on each side with about 3 grains of solids per 24 square inches of surface area using a composition consisting of three parts of heat-reactive alcohol-soluble amino-aldehyde resin and one part of alkyd castor-oil-containing resin plasticizer, applied from solution in a mixture of xylol and butanol, and then heated (see Kellgren U.S. Patent No. 2,548,980).

The sheeted film was heated for about one minute in open air at 500° F. to effect curing. Prior to curing, the film was putty-like and "gobbed" readily on handling. It did not constitute a handleable, self-supporting electrician's tape. After curing, the film and carrier were slit into one inch wide strips and wound into rolls, the carrier serving as an interliner between convolutions of the film in the roll, and thereby preventing the film surfaces from contacting each other in the roll.

Tests were conducted using the silicone tape of this example, stripped from the interliner. The tape or self-supporting film had only a relatively low soluble fraction. Only about 22% of the weight of the tape was lost in solubility tests involving soaking a sample for 24 hours in xylol to extract any soluble fraction. The tape was easily handled and stretched by simple hand tension to well over twice its unstretched length, and it retracted readily to its original length after being stretched up to twice its original length and released. It was found to have an elongation in excess of about 900% before tensile failure (breakage). At a caliper of 29 mils, this tape had a dielectric strength averaging about 645 volts per mil. When stretched by hand tension up to about 2 or 3 times its original length and wrapped in overlapping convolutions, as conventionally done in wrapping splices, the tape fused together in about one week's time to form an integral void-free, sealed insulation having a high dielectric strength and low loss factor.

*Example 2*

The procedure and materials of Example 1 were used except that "Cadox TS" was replaced by 3 parts of a mixture of 50% benzoyl peroxide dispersed in a silicone oil, in this case a dimethyl silicone fluid having a viscosity of about 12,500 centistokes at 100° F. It was found that the tape of this example foamed excessively when heated in open air to accomplish partial curing. In order to prevent foaming, the composition of this example was placed between two 5-mil thick films of polytetrafluoroethylene ("Teflon"), and subjected to a pressure of about 10,000 p.s.i. to spread and flatten the mass between the films. Then, while held under a pressure of about 500 p.s.i., the flattened mass was heated to about 350° F. for about 5 minutes, after which the pressure was removed and the films of polytetrafluoroethylene stripped from each surface of the resulting cured thin sheet. The adhesion between the composition and polytetrafluoroethylene is weak, thus polytetrafluoroethylene films provide suitable low adhesion surfaces for use as here discussed. The silicone sheet was then cut into narrow strips or tapes. The caliper was about 35 mils.

The tapes of this example were found to have a soluble fraction of about 15% by weight. They had an elongation at break of about 790%, and possessed good electrical insulation properties. They were easily stretchable up to about 100% of their original length, readily retracted when stress was released, easily handled in the wrapping of splices, and fused to form a void-free seal after about one week on a splice.

*Example 3*

The procedure and components of Example 1 were used except that 34.5 parts of titanium dioxide (Titanox A) having a particle size of about 300 to 400 millimicrons was milled into the silicone elastomer in place of all the silica of that example, and the composition pressed between "Teflon" films and cured using the special conditions of Example 2. About 25.3% by weight of a sample of this tape was extracted in solubility tests. The tape had a caliper of 25 mils and showed an elongation at break of about 800%. It could be easily stretched by hand tension, and after being stretched up to twice its original length and released, it retracted readily to its original length. The tape was easily handled as a self-supporting film, and it fused onto itself in about one week when stretched and wrapped around a splice.

*Example 4*

About 40 parts by weight of fine silica powder ("Cab-O-Sil") was milled into about 200 parts consisting of the solids content of a silicone pressure-sensitive adhesive solution marketed as "C-269" by Dow Corning Corporation. The volatile organic solvent (xylene) was first removed from the "C-269" solution. Milling was accomplished while running cool water through the rolls of the mill and a satisfactory blending resulted after about 20 minutes of milling. Using the procedure set forth in Example 1, the curing catalyst of that example was milled into this composition. Similarly to the procedure set forth in Example 2, the composition was pressed between films of polytetrafluoroethylene and cured by heating for 5 minutes at 350° F. under about 500 p.s.i. It was then cut to form tape.

While less preferred, the tape of this example illustrates a further variation in composition in preparing the product of this invention. In solubility tests, about 33% of this tape was extracted by xylol in 24 hours. The tape at a caliper of 40 mils thick was easily stretched and retracted readily to its original length after being stretched up to twice that length. Its elongation at break was about 900%. It was not as high in tensile strength as the products of the previous examples, but was a handleable, self-supporting film which fused after about one week on a splice and formed a useful homogeneous insulating covering.

"C-269" is a silicone pressure-sensitive adhesive composition in solution form, believed to be manufactured in accordance with the teaching of U.S. Patent No. 2,736,721 and to contain about equal parts of the silicone resin of Example 1 of that patent and a dimethyl siloxane gum polymer having a viscosity greater than about 1,000,000 centistokes at 25° C. Analysis of the resin component of "C-269" indicated that it is a copolymer of $(CH_3)_3SiO_{1/2}$ units and $SiO_2$ units, with the ratio of $(CH_3)_3SiO_{1/2}$ units to $SiO_2$ units being about 0.85.

*Example 5*

The procedure and components of Example 1 were used except that the curing catalyst and carbon black were omitted. After extruding the composition in a film upon the low adhesion surface of a carrier, it was subjected to high energy ionizing irradiation to cure the silicone gum polymers. The high energy ionizing irradiation was employed in the form of beta particles and the film was given a dose of about one megarep.

The resulting tape product was comparable in its characteristics to the product of Example 1 hereof. As here illustrated, a very small dose of irradiation, which acts primarily to cure the silicone gum polymer component of our mixture, is sufficient to cause substantial changes in our silicone mixture, and the resulting product possesses properties analogous to those obtained by employing a curing catalyst for the silicone gum polymer and heating the films as hereinbefore disclosed.

While extrusion is illustrated as the preferred method for making the self-fusing tapes of this invention, it will be understood that other methods such as, for example, calendering may be used. If desired, the soluble components for making the tape may be blended together in a common solvent or dispersing medium, instead of in dry form on a rubber mill as herein illustrated. After so blending the soluble ingredients, fillers may be dispersed in the mixture, and the dispersed blend then cast on a low-adhesion carrier, the solvent evaporated, and the residue treated as herein described to accomplish substantially complete curing of the silicone gum polymer content.

As the silicone resin for making the handleable films of this invention, we employ a xylene soluble silicone resin which, in essential respects, is a copolymer of $R_3SiO_{1/2}$ units and $SiO_2$ units, where R is preferably an alkyl radical of less than 4 carbon atoms or a phenyl radical, and where the ratio of $R_3SiO_{1/2}$ units to $SiO_2$ units is between about 0.6 and 0.9 inclusive. At least about 90% of the total number of R radicals in the resin are preferably alkyl, methyl being by far the most common alkyl radical in commercially available resins of this type. A small content of $R_2SiO$ units, where R is as above defined, as well as a small amount of groups and radicals other than those aforementioned, may be present in the resin without harmful effect upon the composition of our tape product. Generally between about 20 and 110 parts by weight of resin, based on 100 parts by weight of silicone gum, are employed in practicing the invention hereof, although smaller or larger amounts may be suitable for the making of films or masses having specialized properties. In preferred compositions the amount of silicone resin, based on 100 parts of silicone gum, is maintained in a more limited range, i.e., between about 30 to 70 parts resin for every 100 parts of gum. In this more limited range the most desirable balance of film toughness, self-fusing characteristics, handleable characteristics and other properties are found.

Finely divided silicas constitute the preferred reinforcing fillers for our composition. Fume silica, as illustrated, is a finely divided silica of especially satisfactory properties for use. Fillers which are suitable are characterized as those adapted to increase the tensile strength of rubbery silicone gum elastomers when blended therewith. Silica is particularly effective in performing this function and should be used in concentrations greater than about 20 parts per 10 parts of silicone gum polymer. Other less suitable but still satisfactory finely divided fillers of the required type to employ in making self-supporting, self-fusing, handleable films as taught herein are calcium carbonate, titanium dioxide, diatomaceous earths, etc. These various fillers, as well as other reinforcing fillers, may be used alone or admixed with each other or with silica. However, in order to gain adequate reinforcing when silica is omitted, greater amounts of the other reinforcing fillers, as compared to the amount of silica, usually should be used. In some cases as much as 100 parts of filler for every 100 parts of silicone elastomer in the composition, or even more, may be used.

Many silicone gum polymers may be used to prepare the product hereof. For example, a straight dimethyl polysiloxane polymer may be used. Likewise polymethylsiloxane gums containing some phenyl groups (e.g. up to about 15% by weight) may be used. The building unit for suitable gums has the general formula

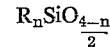

where $n$ has an average value of about 1.99 to 2.0 and R is an organic radical. The ratio of organic groups to silicon atoms in the gums is therefore seen to be about 1.99 to 2.0. These gums are usually linear in structure. They are soft and putty-like, and when placed on a surface and left there for some time at room temperature, they gradually flow out and spread over the surface. However, they are characterized as non-flowing in that a mass of the gum in a container will not flow out of the container when the container is tilted briefly as one would do in the conventional manner to accomplish pouring.

They may be stretched and will string out on stretching. Little or no retractive force is noted on stretching. If stretched too rapidly, they tend to break rather than string out. They are usually soluble, or at least readily dispersible, in xylene. After they are cured, as in our composition, they become flexible, resilient and are essentially insoluble in xylene. In preferred gums, at least a major proportion of the R groups are methyl, and at least some R groups (e.g., up to about 5% by weight) are alkenyl groups having less than 6 carbon atoms, e.g., vinyl, allyl, pentenyl, etc.

The curing mechanism for the silicone gum component of the silicone films hereof may vary. Sufficient curing of the gum in the composition is accomplished when the soluble components of the composition are reduced to not more than 40% by weight, preferably not more than about 25%, as determined by soaking the composition for 24 hours in xylol and calculating the weight percent of extracted components. As illustrated in Example 5, no curing agent need be employed where high energy ionizing irradiation is used to cure the silicone gum polymer. Other examples hereof illustrate the use of a curing catalyst and heating in order to accomplish curing. The curing agent chosen is one known to function as a curing agent for silicone gums. Several peroxides are known to perform this function, as illustrated. Ditertiary butyl peroxide is a further example of such an agent. Lead octoate, a well-known curing agent for silicone resins, is not satisfactory to employ as the sole curing agent for compositions hereof although it may be present in the composition in small amounts without harmful results, provided a curing mechanism for the silicone gum polymer is also employed in the manufacture of our product. Curing in some cases, as illustrated in Example 1, may be accomplished by merely heating a composition containing a curing agent for silicone gum polymers for a brief period of time in open air. In other cases, foaming may result if the heat-curing step is conducted in open air, as illustrated in Example 2; consequently, curing of such compositions is preferably accomplished in a manner such as illustrated in that example. While trial runs may be necessary to determine which method is best for any particular combination of ingredients, such trial runs can readily be conducted by following the teachings hereof, keeping in mind the characteristics of the end product afore-delineated.

The composition of this invention is particularly useful in the electrical insulation art. Where desired, it may be laminated to other materials, or other materials may be embedded in it to form strips or tapes of special properties for certain uses. An illustrative construction of this type may comprise a layer of glass fibers or filaments and a layer of our composition laminated thereto. Where stretch properties are desired in laminated constructions, the weave of a cloth backing may be oriented in the tape laminate so that the fibers are at about 45° angles to the length of the strip. Fibers or filaments may be oriented transversely to the length of a strip of our composition, and embedded therein, to provide a further type of stretchable tape construction.

The foregoing description is offered to illustrate but not limit our invention, as further set forth in the appended claims, and all equivalents are fully comprehended.

That which is claimed is:

1. A handleable, flexible, ozone-resistant silicone composition adapted to fuse onto itself to form a void-free seal at room temperature in up to about one week's time after left in snug contact with itself, said composition being a blend, at least 60% of which is insoluble in xylene, and comprising 100 parts by weight of highly cured silicone gum polymer having a ratio of organic groups to silicon atoms of about 1.9 to 2.0, a silicone resin, said resin being a copolymer composed essentially of $R_3SiO_{1/2}$ units and $SiO_2$ units, where R is an organic radical and where the ratio of $R_3SiO_{1/2}$ units to $SiO_2$ units in said copolymer is between about 0.6 and 0.9, inclusive, and at least about 20 parts of a reinforcing filler powder.

2. A self-fusing, flexible, stretchable and retractable, ozone-resistant silicone tape adapted to form void-free seals about splices and the like and to withstand continuous operation at temperatures within the range of about minus 80° F. to plus 350° F. without embrittlement, cracking or appreciable loss of electrical properties, said tape being characterized by being handleable and by being retractable to its original length substantially instantaneously upon release of stress after being stretched under ordinary hand tension up to twice its original length, and further characterized by fusing together to form a void-free seal at room temperature in up to about one week's time after being wrapped, using ordinary hand tension, in convolutions upon itself around a splice, said tape comprising a blended composition, at least 60% of which is insoluble in xylene, and including 100 parts by weight of highly cured silicon gum polymer having the ratio of organic groups to silicon atoms of about 1.9 to 2.0, a silicone resin, said resin being a copolymer composed essentially of $R_3SiO_{1/2}$ units and $SiO_2$ units, where R is an organic radical and where the ratio of $R_3SiO_{1/2}$ to $SiO_2$ units in said copolymer is between about 0.6 and 0.9, inclusive, and at least about 20 parts of a reinforcing filler powder.

3. A self-fusing, flexible, stretchable and retractable, ozone-resistant silicone tape adapted to form void-free seals about splices and the like and to withstand continuous operation at temperatures within the range of about minus 80° F. to plus 350° F. without embrittlement, cracking or appreciable loss of electrical properties, said tape being characterized by being handleable and by being retractable to its original length substantially instantaneously upon release of stress after being stretched under ordinary hand tension up to twice its original length, and further characterized by fusing together to form a void-free seal at room temperature in up to about one week's time after being wrapped, using ordinary hand tension, in convolutions upon itself around a splice, said tape comprising a blended composition, at least 60% of which is insoluble in xylene, and including 100 parts by weight of highly cured silicone gum polymer having a ratio of organic groups to silicon atoms of about 1.9 to 2.0, at least 20 parts and not more than about 110 parts of a silicone resin, said resin being a copolymer composed essentially of $R_3SiO_{1/2}$ and $SiO_2$ units, where R is an organic radical and where the ratio of $R_3SiO_{1/2}$ units to $SiO_2$ units in said copolymer is between about 0.6 and 0.9, inclusive, at least about 20 parts of a reinforcing filler powder, and a curing agent for said silicone gum polymer.

4. A self-fusing, flexible, stretchable and retractable, ozone-resistant silicone tape adapted to form void-free seals about splices and the like and to withstand continuous operation at temperatures within the range of about minus 80° F. to plus 350° F. without embrittlement, cracking or appreciable loss of electrical properties, said tape being characterized by being handleable and by being retractable to its original length substantially instantaneously upon release of stress after being stretched under ordinary hand tension up to twice its original length, and further characterized by fusing together to form a void-free seal at room temperature in up to about one week's time after being wrapped, using ordinary hand tension, in convolutions upon itself around a splice, said tape comprising a blended composition, at least 60% of which is insoluble in xylene, and including 100 parts by weight of highly cured silicone gum polymer having a ratio of organic groups to silicon atoms of about 1.9 to 2.0, at least 20 parts and not more than about 110 parts of a silicone resin, said resin being a copolymer composed essentially of $R_3SiO_{1/2}$ units and $SiO_2$ units, where R is an organic radical and where the ratio of $R_3SiO_{1/2}$ to $SiO_2$ units in said copolymer is between about 0.6 and 0.9, inclusive, and at least about 20 parts of a finely divided reinforcing silica powder.

5. A self-fusing, flexible, stretchable and retractable, ozone-resistant silicone tape adapted to form void-free seals about splices and the like and to withstand continuous operation at temperatures within the range of about minus 80° F. to plus 350° F. without embrittlement, cracking or appreciable loss of electrical properties, said tape being characterized by being handleable and by being retractable to its original length substantially instantaneously upon release of stress after being stretched under ordinary hand tension up to twice its original length, and further characterized by fusing together to form a void-free seal at room temperature in up to about one week's time after being wrapped, using ordinary hand tension, in convolutions upon itself around a splice, said tape comprising a blended composition, at least 60% of which is insoluble in xylene, and including a highly cured dimethyl siloxane polymer having up to 5% by weight of alkenyl groups along the chain of said polymer, at least 20 parts and not more than about 110 parts of a silicone resin for every 100 parts total of silicone gum polymer in said composition, said resin being a copolymer composed essentially of $R_3SiO_{1/2}$ units and $SiO_2$ units, where R is an organic radical and where the ratio of $R_3SiO_{1/2}$ to $SiO_2$ units in said copolymer is between about 0.6 and 0.9, inclusive, and at least about 20 parts of a reinforcing filler powder for every 100 parts total of silicone gum polymer in said composition.

6. As a new article of manufacture: a self-fusing, flexible, stretchable and retractable, ozone-resistant silicone tape in roll form having a low adhesion interliner strip separating the convolutions of said tape in said roll, said tape being adapted to form void-free seals about splices and the like and to withstand continuous operation at temperatures within the range of about minus 80° F. to plus 350° F. without embrittlement cracking or appreciable loss of electrical properties, said tape being characterized by being handleable and by being retractable to its original length substantially instantaneously upon release of stress after being stretched under ordinary hand tension up to twice its original length, and further characterized by fusing together to form a void-free seal at room temperature in up to about one week's time after being wrapped, using ordinary hand tension, in convolutions upon itself around a splice, said tape comprising a blended composition, at least 60% of which is insoluble in xylene, and including 100 parts by weight of highly cured silicone gum polymer having a ratio of organic groups to silicon atoms of about 1.9 to 2.0, a silicone resin, said resin being a copolymer composed essentially of $R_3SiO_{1/2}$ units and $SiO_2$ units, where R is an organic radical and where the ratio of $R_3SiO_{1/2}$ to $SiO_2$ units in said copolymer is between about 0.6 and 0.9, inclusive, and at least about 20 parts of a reinforcing filler powder.

7. A handleable, flexible, ozone-resistant tape construction comprising a reinforced structure including glass fibers and a silicone composition characterized by an ability to fuse onto itself to form a void-free seal at room temperature in up to about one week's time after left in snug contact with itself, said composition being a blend, at least 60% of which is insoluble in xylene, and comprising 100 parts by weight of highly cured silicone gum polymer having a ratio of organic groups to silicon atoms of about 1.9 to 2.0, a silicone resin, said resin being a copolymer composed essentially of $R_3SiO_{1/2}$ units and $SiO_2$ units, where R is an organic radical and where the ratio of $R_3SiO_{1/2}$ units to $SiO_2$ units in said copolymer is between about 0.6 and 0.9, inclusive, and at least about 20 parts of a reinforcing filler powder.

References Cited in the file of this patent

UNITED STATES PATENTS

| Number | Name | Date |
|---|---|---|
| 2,530,635 | Sowa | Nov. 21, 1950 |
| 2,607,711 | Hendricks | Aug. 19, 1952 |
| 2,658,882 | Maneri | Nov. 10, 1953 |
| 2,672,978 | Hickox | Mar. 23, 1954 |
| 2,744,041 | Balchen | May 1, 1956 |
| 2,789,155 | Marshall et al. | Apr. 16, 1957 |
| 2,814,601 | Currie et al. | Nov. 26, 1957 |

FOREIGN PATENTS

| Number | Country | Date |
|---|---|---|
| 685,664 | Great Britain | Jan. 7, 1953 |
| 203,314 | Australia | Sept. 13, 1956 |

UNITED STATES PATENT OFFICE
CERTIFICATE OF CORRECTION

Patent No. 3,006,463                                      October 31, 1961

Herbert M. Bond et al.

It is hereby certified that error appears in the above numbered patent requiring correction and that the said Letters Patent should read as corrected below.

Column 1, line 53, for "deteroration" read -- deterioration --; column 3, line 66, for '"Cardox TS"' read -- "Cadox TS" --; column 6, line 43, for "10" read -- 100 --.

Signed and sealed this 17th day of April 1962.

(SEAL)
Attest:

ESTON G. JOHNSON                                      DAVID L. LADD

Attesting Officer                                          Commissioner of Patents